United States Patent
Barratt

(10) Patent No.: US 7,768,960 B1
(45) Date of Patent: Aug. 3, 2010

(54) EFFICIENT COMMUNICATION CHANNEL SURVEY

(75) Inventor: Craig H. Barratt, Redwood City, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1759 days.

(21) Appl. No.: 10/896,294

(22) Filed: Jul. 20, 2004

(51) Int. Cl.
*H04W 4/00* (2009.01)
(52) U.S. Cl. .................. 370/328; 370/338; 455/438
(58) Field of Classification Search ............. 370/328, 370/338; 455/438
See application file for complete search history.

(56) References Cited

U.S. PATENT DOCUMENTS 6,088,591 A * 7/2000 Trompower et al. ........ 455/438

2005/0171720 A1 * 8/2005 Olson et al. ................ 702/121

* cited by examiner

*Primary Examiner*—Patrick N Edouard
*Assistant Examiner*—Chuck Huynh
(74) *Attorney, Agent, or Firm*—Bever, Hoffman & Harms, LLP; Jeanette S. Harms

(57) ABSTRACT

A system and method are described for repeatedly and efficiently performing a wireless communication channel survey to determine whether comparable communications devices exist, which frequencies are in use, and the identities of the comparable communications devices. A beacon data table stores received beacon data which is used to predict beacon arrival times, thereby allowing a receiver to be tuned away from an active data communications channel for a shorter dwell time than a beacon period. A further efficiency can be gained if beacon generators cooperatively stagger their beacon times according to one or more measurable characteristics of the beacon generator, e.g. the operating channel number and the SSID.

5 Claims, 6 Drawing Sheets

Fig. 6

|  | 620 (TS 1) | 622 (TS 2) | 624 (TS 3) | 626 (TS 4) | 628 (TS 5) | ... (TS N) |
|---|---|---|---|---|---|---|
| 610 (CH 1) | b | | | | | |
| 612 (CH 2) | | B | | | | |
| 614 (CH 3) | | | b | | | |
| 616 (CH 4) | | | | b | | |
| 618 (CH 5) | | | | | B | |
| (CH N) | | | | | | |

EFFICIENT COMMUNICATION CHANNEL SURVEY

BACKGROUND OF THE INVENTION

1. Field of the Invention

The present invention relates to digital wireless communication systems. More particularly, the invention relates to a system and method for repeatedly and efficiently performing a wireless communication channel survey to determine whether comparable communications devices exist, which frequencies are in use and the identities of the comparable communications devices.

2. Background of the Related Art

Existing digital wireless communication systems communicate on a single RF channel at any one time, as exemplified by access points and clients (also called, "nodes") compliant with the IEEE-802.11-1999 family of standards. A client, when first initialized, must seek a compatible access point with which it may associate in order to pass traffic. Although, according to the standards, traffic is passed on only one channel at a time, a plurality of channels of available wireless spectrum are available for use. Seeking a compatible access point requires a client to tune to each available channel and either actively solicit (sending a "probe") or passively listen for an identifying transmission (a "beacon") as described, by way of example and not limitation, in section 7 of the IEEE-802.11-1999 standard. Since the client or an access point might be in motion or subject to environmental or infrastructure changes, a client will periodically search the available channels in order to determine and present the best wireless data connectivity options to a host device.

Low cost, high volume wireless local area network (WLAN) devices are typically equipped with one receiver which must perform both data transfer as well as periodic site surveys. Since, with a single receiver, time spent scanning for channel activity on other than the currently utilized data communications channel requires the client to temporarily suspend data communication with an associated access point (AP), throughput during the scanning time is effectively zero. This "dead time" is especially lengthy in regions wherein the RF regulatory environment prohibits sending a probe, requiring the receiver to dwell on a channel until a beacon is heard or a time limit (typically 100 ms but as much as two seconds) is reached.

There is thus a need in the art for a method and system of efficiently surveying a plurality of available wireless communications channels. There is, further, a need for the method and system to work efficiently in an environment comprised of existing standards-compliant equipment. There is yet a further need felt in office environments implementing WLANS on a plurality of wireless communications channels which would be populated predominantly with enhanced access points for a further improvement in efficiency.

SUMMARY OF THE INVENTION

An initial survey to determine the availability of communication channels can be undesirably slow and inefficient. Subsequent surveys, which can be similarly slow and inefficient, are typically performed based on the requirements of certain standards and/or RF regulatory environments. In accordance with one aspect of the invention, one or more optimized subsequent surveys can be performed in lieu of non-optimized surveys. Moreover, should occasional non-optimized surveys be required by certain standards and/or RF regulatory environments, the results obtained using one or more optimized surveys can advantageously reduce the frequency of such non-optimized surveys.

In view of the above deficiencies of the available art, it is an object of the invention to provide an apparatus and method for efficiently surveying a plurality of available wireless communications channels by storing data from received beacons in a beacon data table and subsequently revisiting a communications channel at a time when a beacon on that channel is expected.

It is another object of the invention to provide the advantages of efficient surveying by revisiting less frequently those beacons whose Received Signal Strength Indication (RSSI) data or history would indicate a less attractive association target (e.g., low signal strength or a fluctuating signal strength).

It is yet another object of the invention to provide the advantages of efficient surveying by widening an expected arrival window if a beacon is not received on a particular channel when expected.

It is still another object of the invention to cooperatively temporally disperse beacon occurrences amongst like-disposed, enhanced access points, in such a manner that a client receiving a beacon on any channel from an enhanced access point would be able to populate its beacon data table (BDT) with predicted times of arrival for the plurality of available channels.

It is a further object of the invention to maintain time synchronization amongst enhanced APs by, for example, performing relatively infrequent background scans for beacon data on other channels or using network time reference facilities to regulate an internal timer.

The above objects are achieved in some embodiments by providing an enhanced client that stores received beacon data, optionally including RSSI history derived from the receiver circuit, in a beacon data table. When the client desires to update its channel survey, it calculates predicted arrival times based on an internal timer and the contents of the beacon data table.

The client selects the closest-in-time beacon arrival time (also referred to as recurrence time) and tunes its receiver to that channel and waits for a Window_size period to receive a beacon. The Window_size parameter may be chosen as a fixed fraction of the beacon interval time. If a beacon is received, the contents of the beacon data table are updated with the received data. If the beacon data is not received, the data table may be updated with a predicted beacon data set. Success (receiving a beacon) or failure (not receiving a beacon) is reported in substantially the same manner as surveys conducted less efficiently by current commercially-available equipment, as will be understood by those skilled in the art to which the invention pertains.

In another embodiment, Window_size is variable and made dependent upon a failure to receive a beacon at the predicted time, up to the limit where Window_size is equal to or greater than the Beacon_interval, at which point there is no longer an efficiency to be gained for this entry.

In yet another embodiment, an RSSI from the client receiver section can be stored in the beacon data table along with a history of prior RSSIs and used to revisit less frequently those beacons whose signal amplitudes are low or historically unstable.

In still another embodiment, an access point may be enhanced to cooperatively temporally disperse beacon occurrence amongst like-disposed, enhanced access points by having a newly-initialized access point scan from the lowest available channel seeking an existing beacon. In one embodiment, the timestamp received as part of the beacon data from the beacon heard on the lowest frequency channel is used to set the newly-initialized access point's internal timer. In another embodiment, enhanced access points may coordinate internal timer synchronization in a manner similar to that described by §11.1.2.2 of the IEEE-802.11-1999 standard, incorporated herein by reference. In still another embodiment, a network time reference protocol (e.g., NTP as defined by RFC 1305) may be used to regulate internal timer synchronization. The terms, "set," "coordinate" and "regulate" in this context mean to maintain timer synchronization to a higher degree of precision than would be commonly possible among free-running timers. In some embodiments, the newly-initialized access point then offsets its beacon generation time dependent upon one or more preset data values associated with the AP, for example, the newly-initialized access point's assigned operating channel. This scheme has the advantage that an enhanced client in an enhanced access-point environment will be able to proactively populate its table of beacon data based upon receipt of a single beacon with predicted beacon data, being already loaded with a record of the a priori relationship of beacon times to channel frequency.

BRIEF DESCRIPTION OF THE DRAWINGS

These and other objects, features and advantages of the present invention are better understood by reading the following detailed description of the preferred embodiment, taken in conjunction with the accompanying drawings, in which:

FIG. 6 shows the time-skewed beacon generation in one embodiment of an enhanced access point.

DETAILED DESCRIPTION OF EXEMPLARY EMBODIMENTS

Figure 1:
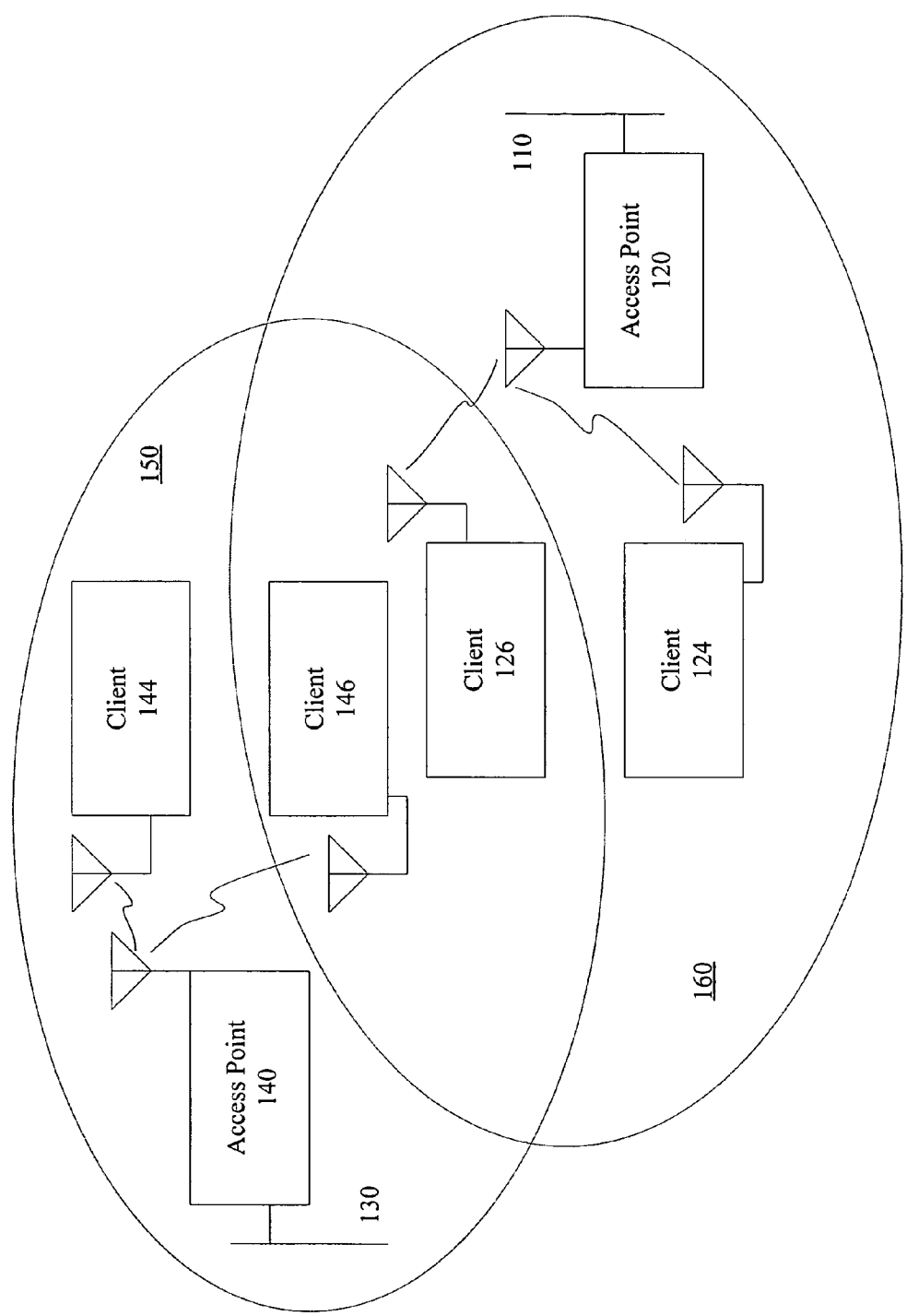
FIG. 1 is a block diagram of a digital communication system showing access points 120 and 140 coupled to networks 110 and 130 and communicating with clients 124, 126, 144 and 146 in two overlapping WLAN areas 150 and 160.

FIG. 1 shows access points 120 and 140 coupled to networks 110 and 130 and communicating with clients 124, 126, 144 and 146 in two overlapping WLAN areas 150 and 160. Clients 144 and 146 are associated with access point 140 and clients 124 and 126 are associated with access point 120. Each of clients 126 and 146 can receive data from both access points 120 and 140.

Accordingly, client 146 will periodically attempt to receive a beacon from access point 120 and client 126 will periodically attempt to receive a beacon from access point 140. Should client 146 receive a beacon from access point 120 with an RSSI greater (or, in some embodiments, greater by some threshold value) than that received from access point 140, client 146 might choose to associate with access point 120.

Figure 2:
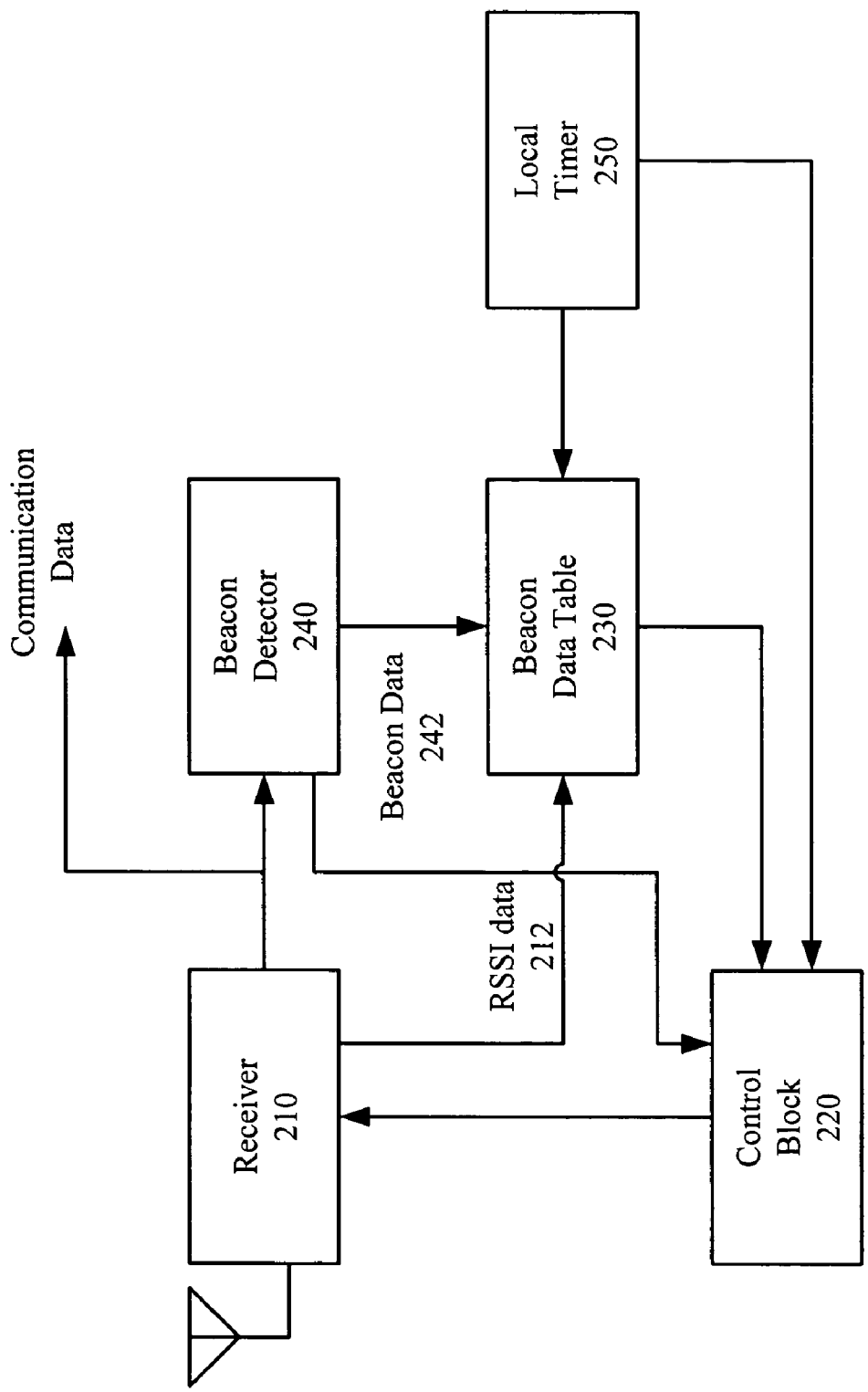
FIG. 2 is a block diagram of a client.

FIG. 2 is a block diagram of a client. Receiver 210 receives both data communications and beacons from access points. Beacon detector 240 produces beacon data 242 which is stored, along with a local timestamp derived from local timer 250, in beacon data table 230 as a beacon data set. In one embodiment, RSSI data 212 produced by receiver 210 is also stored in the beacon data table 230. Control block 220 receives data from the local timer 250 and the beacon data table to periodically trigger receiver 210 to perform a wireless communication channel survey. This survey can determine whether other comparable communications devices exist, which frequencies are in use and the identities of the comparable communications devices.

Control block 220 may generally control beacon data table 230 as a general purpose memory. Control block 220 is implemented as software in some embodiments.

If beacon detector 240 detects a beacon from an enhanced access point (discussed in reference to FIG. 3) according to one embodiment, enhanced beacon data from the received beacon is stored in the beacon data table as well as predicted beacon data stored as a predicted data set for other enhanced access points. Beacon data includes a timestamp as well as a beacon interval value (as specified, for example, in §7.3.2.1 of the IEEE-802.11-1999 standard and illustrated in Table 5 of the same reference). Predicted beacon data for other enhanced access points is generated by calculating an offset value that is some fraction of a beacon time multiplied by a factor derived from one or more preset data values associated with the AP, for example, the newly-initialized access point's assigned operating channel. In some embodiments, the multiplicative factor may be derived, in whole or in part, from a "hash" (a mathematical function that maps values from a large (or very large) domain into a smaller range) of, for example, the Service Set Identification (SSID) or the Basic Service Set Identification (BSSID) of the AP.

Figure 3:
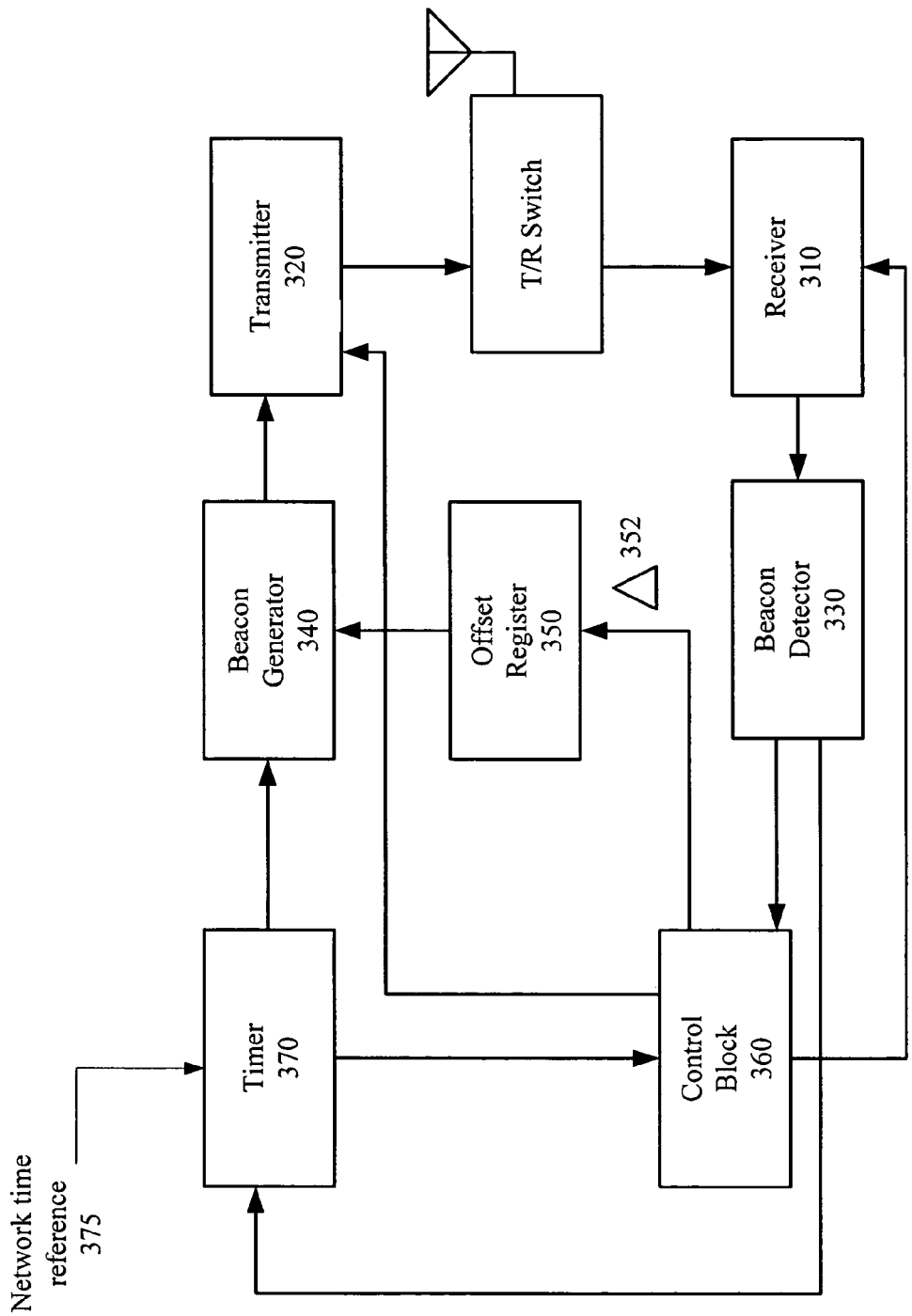
FIG. 3 is a block diagram of an access point.

FIG. 3 shows a block diagram of an enhanced access point according to one embodiment. Upon initialization, receiver 310 is controlled by control block 360 to sequentially scan from the lowest frequency wireless communication channel seeking an enhanced beacon signal. Beacon detector 330, upon detecting an enhanced beacon transmission, records the channel number and sets timer 370 to the timestamp of the received beacon. Control block 360 calculates a beacon generation offset delta value 352 based upon, in the illustrated embodiment, the assigned channel of the access point which is sent to offset register 350. Beacon generator 340 is connected to transmitter 320 and transmits beacons at an offset time in accordance with offset register 350. Control block 360 is implemented as software in some embodiments. In some embodiments, timer 370 may be regulated by a network time reference, 375 as described earlier.

Figure 4:
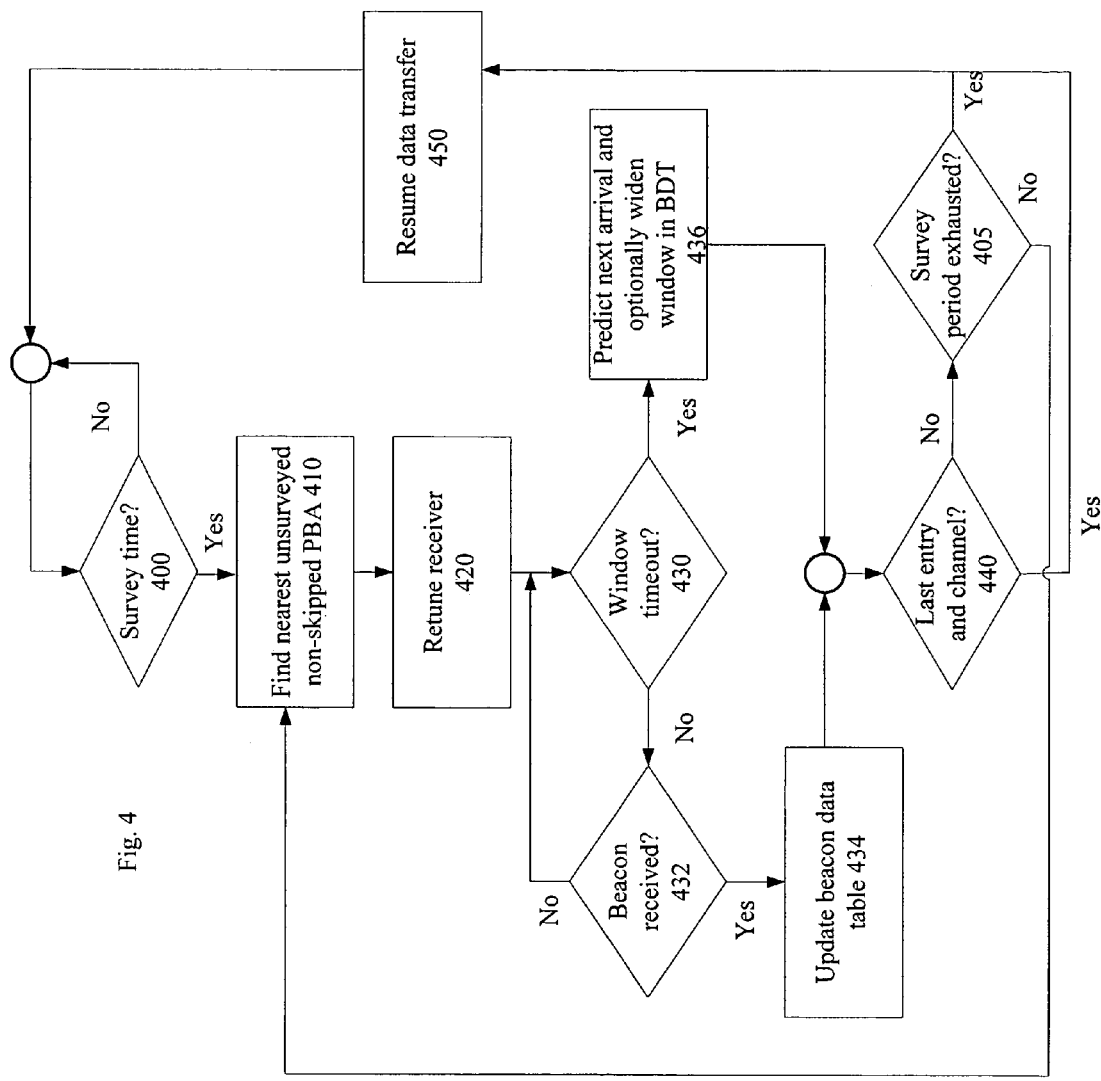
FIG. 4 is a flowchart showing a survey of available wireless communications channels by a client.

FIG. 4 shows a flowchart illustrating control flow of one embodiment of the client. Decision block 400 loops waiting for the local time to reach a survey time trigger. When a survey is triggered, the nearest-in-time, unsurveyed beacon entry in the beacon data table, called the Predicted Beacon Arrival (PBA), that has a zero skip count is read in block 410 and the channel data for that entry causes the receiver to be tuned to the channel on which the beacon is expected to be received in block 420.

The PBA may be calculated (for a symmetric window) as:

$$PBA=LT+(BI-((LT+(WT/2)-ST)\%BI)$$

Where:

LT is the value of the local timer (e.g., local timer 250)

BI is the beacon interval

WT is the Window_time value

ST is the stored arrival timestamp taken from the beacon data table

% is the modulo (also known as "remainder") operator

The skip count is used by some embodiments wherein RSSI data history is stored in the beacon data table. A low RSSI value or unstable RSSI history, as determined by the control block, may result in a non-zero skip count being set in the beacon data table entry.

Decision block 430 tests to see if the beacon reception window has expired. If not, the receiver continues to wait for the expected beacon by transiting detection decision block 432, else block 436 is executed, storing a new, predicted, arrival time in the beacon data table and optionally expanding the size of the beacon detection window in the beacon data table and control passes to decision block 440.

If the beacon is received during the window time, the entry for this beacon is updated in the beacon data table in block 434 with a recurrent beacon data set and then decision block 440 is entered.

The beacon window in some embodiments is fixed. In another embodiment, the window is widened if no beacon is received within the window time. As described previously, once the window is opened to the size of the beacon interval the window time is limited since no gain in efficiency is realized. If a variable window size is used, reception of a beacon may preferably reset the reception window to its smallest value in some embodiments.

Decision block 440 tests to see if all channels and entries in the beacon table have been scanned. If true, the receiver is retuned to the original data transfer channel and data reception is resumed in block 450, and the process returns to decision block 400. If false, decision block 405 is entered and a test made to see if a survey period has been exhausted. If so, control passes to block 450 and data communication is resumed as described above, else control passes to block 410. In one embodiment, the survey period is effectively infinite, permitting all BDT entries to be surveyed in one pass.

Figure 5:
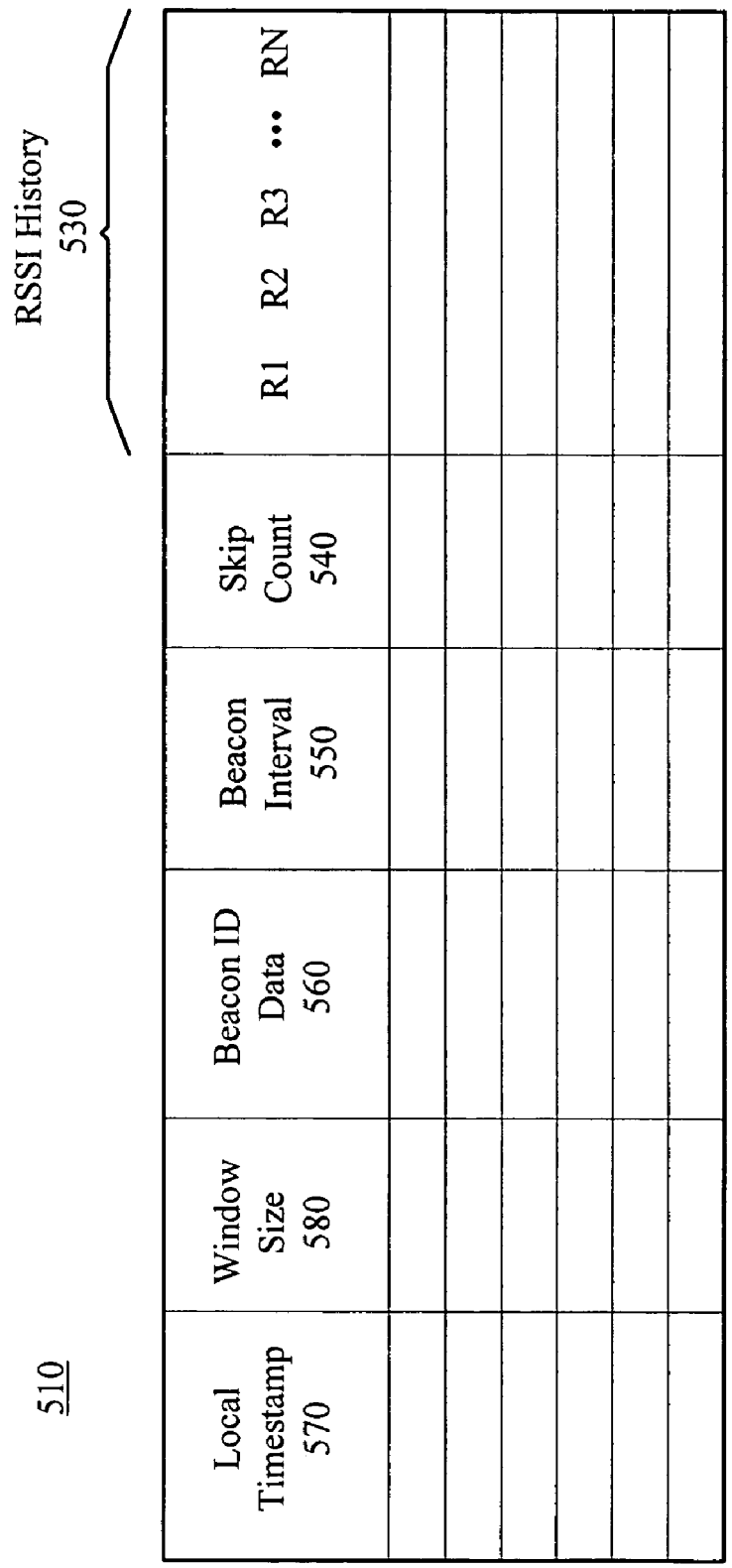
FIG. 5 illustrates the data fields of a beacon data table.

FIG. 5 shows the data fields that comprise an entry 520 of the beacon data table 510 in one embodiment. Some embodiments use fields 530 to store an RSSI history of received beacon signals. A skip count field 540 allows a beacon signal with a less desirable characteristic (e.g., low or unstable stable signal amplitude) to be revisited less frequently, as described above. Fields also exist for storing a local timestamp 570, window size 580, beacon ID data 560 (including, without limitation, channel number and Service Set Identification (SSID)), and the beacon interval 550.

FIG. 6 shows a table of available, assigned and in-use time slots for an enhanced access point embodiment of the instant invention. Each intersection of channel numbers 610-618 and time slots 620-628 represents an available time and frequency for a beacon broadcast. Intersections containing a lower-case letter "b" represent assigned time slots according to one embodiment. Intersections containing the upper-case letter "B" represent in-use time slots.

In some embodiments, a cache of data representing detected beacons is stored in a client beacon data table and subsequently used to efficiently refresh a survey of wireless communication channels. In these embodiments, detected beacons are revisited and detection is attempted using a fixed reception window as described above. Control and analysis of the received beacon data is performed in software in one embodiment.

In another embodiment, the beacon reception window is modulated as a function of missed beacon detection as described above.

In yet another embodiment, beacons that exhibit one or more less desirable characteristics (e.g., low or unstable stable signal amplitude) are associated with a skip field in the beacon data table so as to reduce the frequency with which such less desirable beacons are surveyed.

In still another embodiment, enhanced access points cooperatively temporally offset beacon time slots that are preferably non-overlapping in time so that a survey of such beacons is optimized by allowing a client to predict a plurality of beacon arrival times upon receipt of a single enhanced beacon signal. In particular, the channel frequency is used as the factor from which temporal offsets are generated. Other device-specific characteristics such as a MAC address or SSID may similarly serve to derive beacon time offsets.

In a further embodiment, "stale" beacon data table entries (i.e., those that have not been updated with received data for a predetermined period of time) may be removed from the table, thereby avoiding clutter.

A vendor-specific flag is used in the beacon data to signal similarly enhanced clients to populate their beacon data tables based on the receipt of a single beacon sent from an enhanced access point. In this embodiment, access points seek a peer, which becomes the de facto time reference for all access point beacon generation.

It is a goal of the instant invention in all of the above-described embodiments to interoperate with devices compatible with existing standards. Such devices are expected to operate in an environment defined, by way of example and not limitation, by §7 of the above-referenced IEEE-802.11-1999 standard.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method of providing an efficient multiple wireless communication channel survey, the method comprising:
   tuning a receiver to a plurality of wireless communication channels;
   receiving beacon data;
   generating a beacon data set;
   storing the beacon data set in a beacon data table;
   predicting a closest-in-time beacon recurrence based on the beacon data table;
   tuning a receiver to receive the predicted closest-in-time beacon recurrence; and
   when failing to receive a predicted closest-in-time beacon recurrence, updating the beacon data table with a predicted data set based on enlarging a time window during which beacon recurrence is expected and indicating a reception failure to a controller.

2. A method of providing an efficient multiple wireless communication channel survey, the method comprising:
   tuning a receiver to a plurality of wireless communication channels;
   generating a beacon data set including a Received Signal Strength Indication (RSSI) history based on the beacon data;
   storing the beacon data set in a beacon data table;
   predicting a closest-in-time beacon recurrence based on the beacon data table;
   tuning the receiver to receive a predicted closest-in-time beacon recurrence; and
   increasing a skip count of tuning to a wireless communication channel based on one of a low RSSI value and an unstable RSSI history, as indicated by the beacon data table.

3. A system providing an efficient multiple wireless communication channel survey, the system comprising:
   a controller;
   a beacon decoder coupled to a receiver; and
   a beacon data table for storing decoded beacon data from the beacon decoder and a local timestamp,
   wherein the controller is configured to:

predict a closest-in-time beacon recurrence based on information from the beacon data table;

tune the receiver to receive a predicted closest-in-time beacon recurrence; and widen a time window value when a beacon is not received during the predicted closest-in-time beacon recurrence, and update the beacon data table with a recurrent beacon data set.

4. A system providing an efficient multiple wireless communication channel survey, the system comprising:

a controller;

a beacon decoder coupled to a receiver; and a beacon data table for storing decoded beacon data from the beacon decoder, RSSI history data, and a local timestamp, wherein the controller is configured to:

predict a closest-in-time beacon recurrence based on information from the beacon data table;

tune the receiver to receive a predicted closest-in-time beacon recurrence; and increase a skip count of tuning to a wireless communication channel based on one of a low RSSI value and an unstable RSSI history, as indicated by the beacon data table.

5. A system providing an efficient multiple wireless communication channel survey, the system comprising:

a controller;

a beacon decoder coupled to a receiver; and a beacon data table for storing decoded beacon data from the beacon decoder, RSSI history data, and a local timestamp, wherein the controller is configured to:

predict a closest-in-time beacon recurrence based on information from the beacon data table;

tune the receiver to receive a predicted closest-in-time beacon recurrence; and when failing to receive a predicted closest-in-time beacon recurrence, enlarge a time window during which beacon recurrence is expected, and update the beacon data table with a recurrent beacon data set.

\* \* \* \* \*